United States Patent [19]

Schoen et al.

[11] Patent Number: 6,162,374
[45] Date of Patent: Dec. 19, 2000

[54] ELECTRICALLY CONDUCTIVE PIGMENT MIXTURE

[75] Inventors: Sabine Schoen, Darmstadt; Reiner Vogt, Kranichstein; Norbert Schül, Heppenheim; Karl Osterried, Dieburg; Eva-Maria Neugebauer, Darmstadt, all of Germany

[73] Assignee: Merck Patent Gesellschaft mit, Germany

[21] Appl. No.: 09/322,165

[22] Filed: May 28, 1999

[30] Foreign Application Priority Data

May 28, 1998 [DE] Germany .............................. 198 23 867

[51] Int. Cl.7 ........................................................ H01B 1/06
[52] U.S. Cl. .................. 252/511; 252/518.1; 252/520.1; 252/520.2; 252/519.51
[58] Field of Search ................................ 252/506, 518.1, 252/521.3, 520.2, 511, 512, 520.1, 519.51; 106/400, 415, 435, 475, 482

[56] References Cited

U.S. PATENT DOCUMENTS

| | | | |
|---|---|---|---|
| 5,284,705 | 2/1994 | Cahill | 252/518 |
| 5,320,781 | 6/1994 | Stahlecker et al. | 252/518 |
| 5,472,640 | 12/1995 | Brückner et al. | 252/518 |
| 5,716,553 | 2/1998 | Bergmann et al. | 252/518 |
| 5,776,373 | 7/1998 | Bergminn et al. | 252/518.1 |
| 5,945,035 | 8/1999 | Vogt et al. | 252/520.1 |

*Primary Examiner*—Mark Kopec
*Attorney, Agent, or Firm*—Millen, White, Zelano & Branigan, P.C.

[57] ABSTRACT

The present invention relates to pigment mixtures consisting of at least two components, component A being $SiO_2$ flakes coated with one or more metal oxides and component B being one or more electrically conductive pigments, and to their use in varnishes, paints, printing inks and plastics.

21 Claims, No Drawings

ELECTRICALLY CONDUCTIVE PIGMENT MIXTURE

SUMMARY OF THE INVENTION

The present invention relates to pigment mixtures comprising at least two components, non-conductive component A being $SiO_2$ flakes coated with one or more metal oxides and component B being one or more electrically conductive pigments, and to their use in varnishes, paints, printing inks and plastics.

Currently, electrically conductive pigments are used, for example, to produce antistatic coatings for electronic equipment, antistatic floor coverings, antistatic finishes for explosion-protected areas, or electrically conductive primers for the painting of plastics.

Currently, carbon black, graphite and nickel-coated graphite are used for the preparation of dark conductive pigments, and metal platelets and mixed oxides, such as, e.g., antimony-doped tin oxide for the preparation of light-colored pigments. These mixed oxides can be applied to carriers, such as, e.g., mica, $SiO_2$, glass or barium sulfate.

However, owing to their high light absorption in the visible spectral range, carbon black and graphite cannot be used for transparent, pale or colored coatings. A further problem is the strong absorption in the IR (infrared) region, which, e.g., on irradiation by sunlight, leads to the heating of the coated articles, which in many cases is undesirable.

Metal platelets are susceptible to corrosion and can give rise to the formation of hydrogen in aqueous formulations.

The previously used inorganic oxides or mixed oxides in the form of platelets, for example using mica as the base material, or in a form in which their dimensions along the three directions of space are about the same (e.g., spheres or cubes), for example, support free antimony-doped tin oxide, are, due to their geometric shape, typically used in high concentrations in order to exhibit a substantial effect.

Some conductive pigments have been described which comprise three layers, e.g., a metal oxide layer, a silica layer, and an antimony-doped tin oxide layer (see, e.g., U.S. Pat. Nos. 5,320,781 or 5,472,640). The application of an additional layer to the pigment, however, implies a considerable additional expense in production and makes the product more expensive. In addition, the pigment has conductivity values which do not satisfy the high requirements.

In order to improve the conductivity of polymeric systems, such as plastics, paints or printing inks, for example, it is known from DE-A 42 12 950 to employ a pigment consisting of a component A, which consists of one or more conductive, platelet-shaped pigments, and a component B, which comprises one or more conductive, non-platelet-shaped pigments.

It has now surprisingly been found that a pigment mixture comprising non-conductive $SiO_2$ flakes in combination with electrically conductive pigments has better conductive properties than the conductive pigments alone.

The invention hence provides a pigment mixture consisting of at least two components, non-conductive component A being $SiO_2$ flakes coated with one or more metal oxides and component B being one or more electrically conductive pigments, and provides for their use in varnishes, paints, printing inks and plastics.

The invention likewise provides the formulations, such as paints, varnishes, powder coating materials, printing inks, plastics and agricultural films, which comprise the pigment mixture of the invention.

The non-conductive coated $SiO_2$ flakes can be mixed in any proportion with the electrically conductive pigments. The preferred ratio (wt/wt) of component A to component B is about 1:10 to 10:1, in particular about 1:2 to 2:1.

$SiO_2$ flakes produced on a continuous belt in accordance with WO 93/08237 are based on a platelet-shaped, transparent matrix and typically possess a thickness of about 0.1 to 5 μm, in particular about 0.2 o 2.0 μm. The length in the two other dimensions is typically about 1 to 250 μm, preferably about 2 to 100 μm and, more preferably, about 5 to 40 μm. The $SiO_2$ flakes may be covered with one or more metal oxide layers. Examples of suitable metal oxides or metal oxide mixtures are, e.g., titanium dioxide, zirconium oxide, zinc oxide, iron oxides and/or chromium oxide, especially $TiO_2$ and/or $Fe_2O_3$. The $SiO_2$ flakes can be coated, for example, as described in WO 93/08207 (wet chemical coating) or DE-A 196 14 637 (CVD process).

Preferred pigments have the following layer structure: $SiO_2$ flakes+metal+$SiO_2$+metal oxide.

To induce special color effects, fine particles in the nanometer size range can be incorporated additionally into the metal oxide layers of high or low refractive index. Examples of suitable candidates are, e.g., finely divided $TiO_2$ or finely divided carbon (carbon black) with particle sizes of about 10 to 250 nm in diameter. A controlled influence can be exerted on luster and hiding power by virtue of the light-scattering properties of such particles.

By the conductive pigments of component B are understood all pigments known to the skilled worker and comprising, e.g., platelet-shaped, acicular or fiber-like carrier materials, such as, e.g., mica platelets, glass platelets, $SiO_2$ flakes, ceramic platelets, glass fibers, alumina fibers or titanium dioxide fibers that are coated with a conductive layer.

Also suitable in principle are carbon fibers, although in this case no additional conductive coatings are necessary since the fibers already possess sufficient conductivity. By acicular, fiber-like particles are meant those having a length-to-diameter ratio of more than about 5. Suitable platelet-shaped pigments are known, for example, from EP 0 373 575.

The invention additionally provides paints, printing inks, plastics or powder coating materials that are pigmented with the pigment mixture of the invention. The proportion of the pigment mixture therein is about 1 to 80% by weight, preferably more than about 2% by weight, based on the overall solids content of the system in which it is employed.

As a conductive layer on a carrier, particular suitability is possessed by aluminum-doped zinc oxide and by antimony-, halogen- (e.g., fluoride, chloride or iodide) and/or phosphorous-doped tin oxide or titanium dioxide.

The conductive layer is applied in a conventional manner in accordance, for example, with the process described in EP-A 0 139 557. In this process, it is possible to employ all customary conductive metal oxides and/or metal oxide mixtures. A selection of such materials is given, e.g., in EP-A 0 139 557 on page 5, lines 5–19. Preference, however, is given to the application of a conductive layer of antimony-doped tin oxide which is applied in an amount of about 25–100% by weight, in particular in an amount of about 50–75% by weight, based on the substrate.

In the case of the use of an aluminum-doped zinc-oxide layer the amount of the conductive layer is preferably about 40 to 200% by weight based on the carrier material, with amounts of about 100 to 200% by weight being employed with preference.

If the conductive layer comprises tin (IV) oxide or titanium dioxide doped with at least one halide (e.g., fluoride, chloride or iodide, preferably fluoride), then the amount of the conductive layer is about 20 to 200% by weight, preferably about 60 to 150% by weight, based on the carrier material. Pigments of this kind are known, for example, from DE-A 42 43 163. In the case of the conductive layer comprising phosphorous-doped tin oxide the amount of the conductive layer is about 25–100% by weight based on the substrate, especially about 50–75% by weight. Pigments of this kind are known, for example, from DE-A 44 35 301. Larger quantities, although possible, do not bring about any further increase in the conductivity, and the pigments become increasingly darker.

The tin/antimony ratio (wt/wt) is preferably from about 2:1 to 20:1, in particular from 5:1 to 10:1. If the content of antimony is too low it is difficult to achieve high conductivities, whereas with a higher antimony content the pigments become increasingly darker.

Conductive, platelet-shaped pigments which can be assigned to component B of the pigment mixture of the invention are obtainable commercially under the designation Minatec® (Merck KGaA, Darmstadt), and Zelec® ECPM (DuPont). A product marketed under the trade name Minatec® CM 31 consists of mica flakes coated with antimony-doped tin oxide. Under the designation Minatec® CM 30 a conductive pigment is marketed which consists of titanium dioxide-coated mica and which possesses as a conductive layer an antimony-doped tin-dioxide layer.

The combination of non-conductive $SiO_2$ flakes with conductive, platelet-shaped and/or acicular particles leads to conductive products whose electrical properties are better than those of a conductive pigment alone. The advantages become particularly evident when the combinations are incorporated into other formulations, especially in the case of their incorporation into plastics. The use concentrations required for the pigment mixture of the invention in the plastic (pigment volume concentration) are markedly lower than in the case of conventional conductive pigments. This is advantageous not only for the price but also for the properties of the system in which the pigments are employed, since the properties of the plastic are retained more effectively per se if less pigment needs to be introduced. The use specifically of fiber-like conductive pigments frequently also leads to an additional stabilization of the mechanical properties of the plastic.

The pigment mixture of the invention is simple and easy to handle. The pigment mixture can be incorporated into the system in which it is used by simple stirring. Laborious milling and dispersing of the pigments is unnecessary.

The pigment mixture of the invention can be used for pigmenting coating materials, printing inks, plastics, agricultural films, for coating seed or for coloring foods. The concentration of the pigment mixture in the system in which it is used for pigmenting is typically about 0.01 to 50% by weight, preferably about 0.1 and 10% by weight, based on the overall solids content of the system. This concentration is generally dependent on the specific application.

Plastics comprising the pigment mixture of the invention in amounts of about 0.1 to 50% by weight, in particular about 0.5 to 7% by weight, based on the overall solids content of the system, are frequently notable for a particular sparkle effect.

Plastics which comprise the pigment mixture of the invention in amounts of about 0.1 to 10% by weight are, moreover, highly suited to laser marking. The marking operations carried out, for example, with a $CO_2$ or Nd-YAG laser, lead to sharply defined, abrasion-resistant markings.

In the coatings sector the pigment mixture is employed in amounts of about 5-35% by weight. The proportion in which the coated $SiO_2$ flakes are mixed with component B depends on the desired effect. The $SiO_2$ flakes are preferably employed with component B in a ratio of about 1:5, especially about 1:3. In the coating material the pigment mixture of the invention has the advantage that the desired color flop effect is obtained by a single-coat finish. This color flop is extremely pronounced. In comparison with coatings which comprise an interference pigment based on mica rather than the coated $SiO_2$ flakes, coatings with the pigment mixture of the invention exhibit a marked depth effect and a glitter effect.

In the pigmentation of binder systems, for example for paints and printing inks for intaglio, offset or screen printing, pigment mixtures consisting in particular of coated $SiO_2$ flakes with Minatec® (Merck KgaA, Darmstadt) have been found particularly suitable. The pigment mixture is incorporated into the printing ink in amounts of about 2–35% by weight, preferably about 5–25% by weight and, in particular, about 8–20% by weight. The mixing ratio of component A to component B is preferably about 1:5 to 5:1. The printing inks comprising the pigment mixture of the invention exhibit purer hues and are of improved printability owing to the good viscosity values.

The invention hence also provides formulations comprising the pigment mixture of the invention.

In the foregoing and in the following examples, all temperatures are set forth uncorrected in degrees Celsius; and, unless otherwise indicated, all parts and percentages are by weight.

The entire disclosure of all applications, patents and publications, cited above and below, and of German application No. 198 23 867.3 filed May 28, 1998 is hereby incorporated by reference.

The examples which follow are intended to illustrate the invention without, however, limiting it.

EXAMPLES

Example 1

Intaglio printing ink
consisting of:

| | |
|---|---|
| 70 g | of nitrocellulose-based binder from Gebrüder Schmidt, 95MB011, with a solids content of 20% |
| 15 g | of Minatec ® 31 CM (conductive pigment from Merck KGaA, Darmstadt, FRG) |
| 15 g | of $TiO_2$-coated $SiO_2$ flakes with a particle size of 5 to 40 μm |
| 30 g | of 1-ethoxy-2-propanol |

Example 2

Plastic 1 kg of polyethylene (PE-HD)granules are uniformly wetted in a tumble mixer with 2 g of adhesion agent. Then 10 g of $TiO_2$-coated $SiO_2$ flakes of particle size 5–40 μm and 2 g of Iriodin® LS 825 (conductive pigment comprising mica platelets coated with antimony-doped tin, from Merck KGaA, Darmstadt, FRG) with a particle size <15 μm are added and the components are mixed for 2 minutes.

These granules are processed under conventional conditions on an injection molding machine to give small stepped plates measuring 4×3×0.5 cm. The small stepped plates are notable for their luster and their laser markability.

Example 3
Coating material

| | |
|---|---|
| 30 g | of TiO$_2$-coated SiO$_2$ flakes of particle size 5–40 μm (Merck KGaA) |
| 10 g | of Minatec 40 CM (conductive pigment, comprising a mixture of mica and spheres coated with antimony-doped tin oxide, from Merck KGaA) |
| 42 g | of paint base (AU-MF system, solids = 19%) |
| 18 g | of diluent mixture |

The coating features antistatic properties and a color flop from pale lilac to pale green.

Example 4 (Comparative)
Example A
10 wt. % of Minatec® CM 30 (component A) and 5 wt. % of Zelec® ECP-S (component B) are incorporated in an acrylic melamine resin lacquer system.

Example B
A mixture of 15% of Minatec and 1% of Fe$_2$O$_3$ coated SiO$_2$ flakes is incorporated in an acrylic maelamine resin lacquer system.
After application to a test panel, the surface resistance is measured.

| Pigment content in lacquer system | Conductivity |
|---|---|
| 10.0% of Minatec/5.0% of Zelec | 1280 ± 10 Ω Prior Art |
| 15.0% of Minatec/1.0% SiO$_2$/Fe$_2$O$_3$ | 1200 ± 10 Ω Application |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

We claim:

1. A pigment mixture comprising a non-conductive component A, which comprises SiO$_2$ flakes coated with one or more metal oxides, and a component B, which comprises one or more electrically conductive pigments.

2. The pigment mixture according to claim 1, wherein said metal oxide is zirconium oxide, zinc oxide, iron oxide, and/or chromium oxide.

3. The pigment mixture according to claim 1, wherein said metal oxide is TiO$_2$ and/or Fe$_2$O$_3$.

4. The pigment mixture according to claim 1, wherein said SiO$_2$ flakes are 0.2 to 2.0 μm thick.

5. The pigment mixture according to claim 1, wherein the length of said SiO$_2$ flakes is 5 to 40 μm.

6. The pigment mixture according to claim 1, further comprising in said metal oxide coating, particles of finely divided TiO$_2$ or finely divided carbon, wherein said particles are 10–250 nm in diameter.

7. The pigment mixture according to claim 1, wherein said component B comprises glass platelets, ceramic platelets, glass fibers, alumina fibers or titanium dioxide fibers, which are coated with a conductive layer.

8. The pigment mixture according to claim 1, wherein said component B comprises SiO$_2$ and/or mica platelets coated with a conductive layer.

9. The pigment mixture according to claim 1, wherein said component B comprises carbon fibers.

10. The pigment mixture of claim 8, wherein said conductive layer is aluminum-doped zinc oxide and/or antimony-, halogen-, and/or phosphorous-doped tin oxide or titanium dioxide.

11. The pigment mixture of claim 8, wherein said conductive layer is antimony-doped tin oxide, wherein said conductive layer is 50 to 75% by weight based on said platelets, and wherein the ratio of tin to antimony is 5:1 to 10:1 (wt/wt).

12. The pigment mixture of claim 8, wherein said conductive layer is aluminum-doped zinc oxide, which is 100 to 200% by weight based on said platelets.

13. The pigment mixture of claim 8, wherein said conductive layer is tin oxide or titanium dioxide doped with one or more halides, and wherein said conductive layer is 60 to 150% by weight based on said platelets.

14. The pigment mixture according to claim 13, wherein said halide is fluoride.

15. The pigment mixture of claim 8, wherein said conductive layer is phosphorous-doped tin oxide, which is 50 to 75% by weight based on said platelets.

16. The pigment mixture according to claim 1, wherein said component B comprises SiO$_2$ platelets and/or mica platelets coated with one or more metal oxides, wherein at least one of said metal oxides is antimony-, fluorine-, and/or phosphorus-doped tin dioxide.

17. A pigment mixture according to claim i, wherein the ratio of component A to component B is 10:1 to 1:10 (wt/wt).

18. The pigment mixture according to claim 17, wherein said ratio is 1:2 to 2:1.

19. A paint, varnish, printing ink, plastic, coloring agent or laser marking agent comprising the pigment mixture according to claim 1.

20. A plastic comprising a pigment mixture according to claim 1, wherein said polymer mixture is 0.5–7% by weight, based on the overall solids content of the system.

21. A formulation comprising a pigment mixture according to claim 1.

* * * * *